United States Patent
Peasley et al.

(10) Patent No.: US 9,649,640 B2
(45) Date of Patent: May 16, 2017

(54) METHODS AND APPARATUS FOR THE CONTINUOUS MONITORING OF WEAR IN FLOTATION CIRCUITS

(71) Applicants: FLSMIDTH A/S, Valby (DK); Bob Peasley, Taylor, UT (US)

(72) Inventors: Bob Peasley, Taylor, UT (US); Dariusz Lelinski, Salt Lake City, UT (US); Robert Heinrichs, Abbotsford (CA); Mads Jespersen, Draper, UT (US); Thien Sok, Salt Lake City, UT (US)

( * ) Notice: Subject to any disclaimer, the term of this patent is extended or adjusted under 35 U.S.C. 154(b) by 0 days.

(21) Appl. No.: 15/303,679

(22) PCT Filed: Apr. 10, 2015

(86) PCT No.: PCT/US2015/025340
§ 371 (c)(1),
(2) Date: Oct. 12, 2016

(87) PCT Pub. No.: WO2015/160656
PCT Pub. Date: Oct. 22, 2015

(65) Prior Publication Data
US 2017/0036219 A1 Feb. 9, 2017

Related U.S. Application Data

(60) Provisional application No. 61/980,481, filed on Apr. 16, 2014.

(51) Int. Cl.
*G08C 19/16* (2006.01)
*B03D 1/02* (2006.01)
(Continued)

(52) U.S. Cl.
CPC ............... *B03D 1/028* (2013.01); *B03D 1/16* (2013.01); *G06K 7/10366* (2013.01)

(58) Field of Classification Search
CPC .......... G01B 7/06; G01B 15/02; H04B 17/15; H04B 17/0057; G06K 7/0008;
(Continued)

(56) References Cited

U.S. PATENT DOCUMENTS 6,137,403 A 10/2000 Desrochers et al.
6,356,201 B1 * 3/2002 Alles ...................... B65G 43/02
340/572.1
(Continued)

FOREIGN PATENT DOCUMENTS

DE    WO 2008102003 A2 *  8/2008  ........... F16J 15/3492
WO    9745203 A1    12/1997

OTHER PUBLICATIONS

The International Search Report and Written Opinion dated Jul. 6, 2015, 10 pages.
(Continued)

*Primary Examiner* — Quang D Pham

(57) ABSTRACT

A system for the continuous monitoring of wear is disclosed. The system comprises a flotation cell having at least one flotation component. At least one detector is provided to the at least one flotation component, and at least one sensor is provided to the flotation cell which is configured to communicate with the at least one detector during operation of the flotation cell. In use, the at least one flotation component wears away and ultimately affects a function of the least one detector. The at least one sensor is configured to monitor said function of the at least one detector. When the at least one sensor detects a change in the signal of the at least one detector, an operator is notified that maintenance or flotation component replacement may be necessary.

9 Claims, 12 Drawing Sheets

(51) Int. Cl.
  *B03D 1/16* (2006.01)
  *G06K 7/10* (2006.01)

(58) Field of Classification Search
  CPC ......... G06K 19/0723; G06K 19/07749; G06K 7/10366; G07C 9/00111; B03D 1/028; B03D 1/16
  See application file for complete search history.

(56) References Cited

U.S. PATENT DOCUMENTS

| | | | | |
|---|---|---|---|---|
| 7,748,521 | B2* | 7/2010 | Aizawa | B65G 43/02 |
| | | | | 198/810.02 |
| 8,384,266 | B2* | 2/2013 | Fish | H01R 39/58 |
| | | | | 310/239 |
| 2002/0109356 | A1* | 8/2002 | Klausing | G01S 7/02 |
| | | | | 290/1 R |
| 2002/0116992 | A1* | 8/2002 | Rickel | B60C 11/24 |
| | | | | 73/146 |
| 2004/0074974 | A1 | 4/2004 | Senba et al. | |
| 2006/0022056 | A1* | 2/2006 | Sakama | G06K 19/04 |
| | | | | 235/492 |
| 2006/0042734 | A1* | 3/2006 | Turner | B60C 11/24 |
| | | | | 152/154.2 |
| 2006/0132351 | A1* | 6/2006 | Le Sesne | G01F 23/2845 |
| | | | | 342/124 |
| 2007/0126580 | A1* | 6/2007 | Roth | G06K 19/07735 |
| | | | | 340/572.1 |
| 2007/0252719 | A1* | 11/2007 | Ray | H04Q 9/00 |
| | | | | 340/679 |
| 2008/0141778 | A1* | 6/2008 | Bosselmann | G01B 15/00 |
| | | | | 73/633 |
| 2010/0139062 | A1* | 6/2010 | Reed | F03D 1/001 |
| | | | | 29/23.51 |
| 2011/0103989 | A1* | 5/2011 | Johnson | F04C 2/1075 |
| | | | | 418/48 |
| 2011/0133923 | A1* | 6/2011 | Evans | B60T 17/221 |
| | | | | 340/454 |
| 2011/0180609 | A1* | 7/2011 | Sato | H01Q 1/2208 |
| | | | | 235/492 |
| 2011/0315883 | A1 | 12/2011 | Harrison et al. | |
| 2012/0075070 | A1* | 3/2012 | Rai | H02K 11/35 |
| | | | | 340/10.1 |
| 2013/0203581 | A1* | 8/2013 | Le Guyader | B04B 7/02 |
| | | | | 494/10 |
| 2013/0230381 | A1* | 9/2013 | Boehm | F04D 15/0088 |
| | | | | 415/1 |
| 2013/0313072 | A1* | 11/2013 | van De Loecht | B65G 54/02 |
| | | | | 198/464.1 |
| 2013/0323057 | A1* | 12/2013 | Buchegger | F03D 11/0025 |
| | | | | 416/61 |
| 2014/0091918 | A1* | 4/2014 | Pfeffer | F16D 66/026 |
| | | | | 340/454 |

OTHER PUBLICATIONS

The International Preliminary Report on Patentability dated Jun. 20, 2016, 6 pages.

* cited by examiner

METHODS AND APPARATUS FOR THE CONTINUOUS MONITORING OF WEAR IN FLOTATION CIRCUITS

CROSS-REFERENCE OF RELATED APPLICATIONS

This application is an international application which claims the benefit of U.S. Provisional Patent Application No. 61/980,481 filed on 16 Apr. 2014, the document of which is hereby incorporated by reference in its entirety for any and/or all purposes set forth herein.

FIELD OF THE INVENTION

This invention relates to equipment and processes for improving the productivity, the usable life, and the efficiency of flotation apparatus and components thereof. More particularly, this invention relates to methods of monitoring the wear of flotation components within flotation cells and systems and apparatus for accomplishing the same.

BACKGROUND OF THE INVENTION

Flotation cells may use polyurethane-cast or polyurethane-coated rotors on a rotating shaft and stationary stators to agitate a slurry containing flotation reagents within a housing. As slurry enters one end of the flotation cell and moves to an opposite end, some of the particles within the slurry, which are made hydrophobic due to the addition of flotation reagent(s), are attached to bubbles formed by virtue of a rotor rotating within a stator. At the opposite end of the flotation cell, coarser particles which are not "floated" exit the housing and may be re-floated or re-ground and then re-floated. Depending on design, flotation cells may also comprise dip tubes. Examples of such flotation cells are the FLSmidth® DORR-OLIVER®, WEMCO®, XCELL™, and SuperCell™ flotation cells.

Rotors, stators, baffles, liners, and lip portions of dip tubes typically exhibit the greatest amount of wear within flotation cells. Abrasive slurry containing particles to be floated scrub against surfaces of these components and wear the surfaces over time. This wear can alter the profiles of these components and possibly alter the fluid dynamics within the cell, leading to losses in efficiency and/or recovery. Since wear experienced by flotation components is not visually observable in operation, a plant operator typically needs to discharge any slurry, pulp, and froth from a flotation cell, and then gain internal access for a closer visual inspection. This takes a significant amount of time, requires shutdown, and reduces throughput. The systems and methods disclosed herein provide a way to continuously monitor the state of wear of components within a flotation cell in-situ and during operation so that the current state of wear can be known without needing to halt the operation of the flotation cell for manual visual inspection.

There are many variations of wear management systems which have been attempted. One example of a conventional wear management system is the Krebs SmartCyclone™ system provided by FLSmidth Krebs. Other examples of conventional wear-management systems may be found in the following patents and patent application publications: U.S. Pat. No. 4,646,001, U.S. Pat. No. 4,655,077, U.S. Pat. No. 5,266,198, U.S. Pat. No. 6,080,982, U.S. Pat. No. 6,686,752, U.S. Pat. No. 6,945,098, and US20030209052.

OBJECTS OF THE INVENTION

It is, therefore, an object of the present invention to provide a method of notifying an operator when a flotation cell internal component has reduced in size, diameter, thickness, width, or height, by a preset amount.

It is also an object of the present invention to provide a method of notifying an operator when a flotation cell internal component has substantially changed in profile or shape, for example, by an amount which might affect flotation machine efficiency, performance, and/or recovery.

It is also an object of the present invention to allow efficient proactive scheduling of maintenance based on quantitative data obtained while a flotation apparatus or circuit remains in service.

A further object of the present invention is to provide an operator with the ability to schedule flotation cell maintenance based on actual measured wear data, thereby optimizing flotation circuit capacity, throughput, rotor life, stator life, dip tube life, baffle life, liner life, and manpower.

It is also an object of the present invention to improve the efficiency of current flotation circuits by extending the usable life of flotation apparatus and components thereof.

It is a further object of the present invention to provide apparatus which are configured to indicate, in real-time, whether a flotation cell component needs to be replaced without the need for temporary decommissioning or visual inspection.

Moreover, an object of the present invention is to provide a cost-friendly, economical way for plant owners to subsidize everyday plant operations, offset maintenance costs, justify large start-up capital expenditures, and lower overhead costs.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

Proposed, are various systems and methods for detecting amounts of flotation cell component wear within a flotation cell during its operation. Also proposed, are methods for indicating a remaining life of said components to an operator in order to adjust/optimize maintenance schedules to reduce machine downtime.

A system for the continuous monitoring of wear is disclosed. The system comprises a flotation cell having at least one rotor, at least one stator, at least one detector provided to the at least one rotor or stator, and at least one sensor provided to the flotation cell which is configured to communicate with the at least one detector during operation of the flotation cell. In use, the at least one rotor or stator wears away and ultimately affects a function of the least one detector. By virtue of communication with the at least one detector, the at least one sensor is configured to monitor said function of the least one detector and determine an operational status of the at least one rotor or stator. In some embodiments, the at least one detector comprises an RFID tag and the at least one sensor comprises a reader/interrogator. In some embodiments, the RFID tag may comprise a low-frequency RFID tag and the at least one sensor may comprise a low-frequency detector/identifier in the kHz range of frequencies. In some embodiments, the at least one detector may comprise an ultra-high frequency RFID tag, and the at least one sensor may comprise an ultra-high frequency detector/identifier in the MHz range of frequencies. In some embodiments, the RFID tag may comprise a microwave RFID tag, and the at least one sensor may comprise a microwave detector/identifier which operates in the GHz range of frequencies. In other embodiments, the at least one detector may comprises a magnet and the at least one sensor may comprise a Hall Effect sensor. In yet further embodiments, the at least one detector may comprise a wafer-style probe comprising a printed circuit board (PCB). In some instances, the at least one detector may comprise a radioisotope capable of emitting alpha particles and/or low energy gamma rays, and the at least one sensor may comprise a radioisotope detector/identifier, wherein the at least one sensor is configured to detect the radioisotope when the at least one detector is exposed after a predetermined amount of componentwear. The at least one detector may comprise a self-powered RF-emitting wireless micro-transmitter, and the at least one sensor may comprise a receiver tuned to the same frequency as said RF-emitting wireless micro-transmitter. In some embodiments, the at least one detector may communicate with the sensor wirelessly. In other embodiments, the at least one detector may be hardwired to the at least one sensor to facilitate communication. Multiple detectors may be provided to the at least one rotor and/or the at least one stator without limitation, and in some instances, at least one detector may be provided to multiple components within a flotation cell. A first detector may be provided to a first component at a first radial location which is different than the radial location of a second detector in a second component.

At least one component (e.g., a rotor, stator, dip tube, baffle, or liner) for use in a flotation cell is also disclosed. The component may comprise at least one detector which is configured to communicate with a sensor provided to the flotation cell (e.g., above the flotation cell, below the flotation cell, and/or on a side portion of a flotation cell). In use, the at least one component may wear away and ultimately affect a functionality of the least one detector. By virtue of communication with said sensor, the at least one detector may aid in determining an operational status of the at least one component. In some embodiments, the at least one detector may comprise an RFID tag. In some embodiments, the at least one detector may comprise a magnet. In some embodiments, the at least one detector may comprise a wafer-style probe comprising a printed circuit board (PCB). In some embodiments, the at least one detector may comprise a radioisotope capable of emitting alpha particles and/or low energy gamma rays. Multiple detectors may provided to the at least one component in any conceivable fashion or pattern, without limitation. For instance, in some embodiments, multiple detectors may be provided to different radial, axial, or circumferential portions or locations of a flotation cell component. In certain embodiments, a detector may be provided to a component as a separate component within a cavity. A threaded insert, cover plug, cover cap, and/or tapered cover plug may be utilized to capture a detector within said cavity. In other embodiments, detectors may be molded into a cavity provided within a component.

BRIEF DESCRIPTION OF THE DRAWING

To complement the description which is being made and for the purpose of aiding to better understand the features of the invention, a set of drawings is attached to the present specification as an integral part thereof, in which the following has been depicted with an illustrative and non-limiting character.

Figure 1:
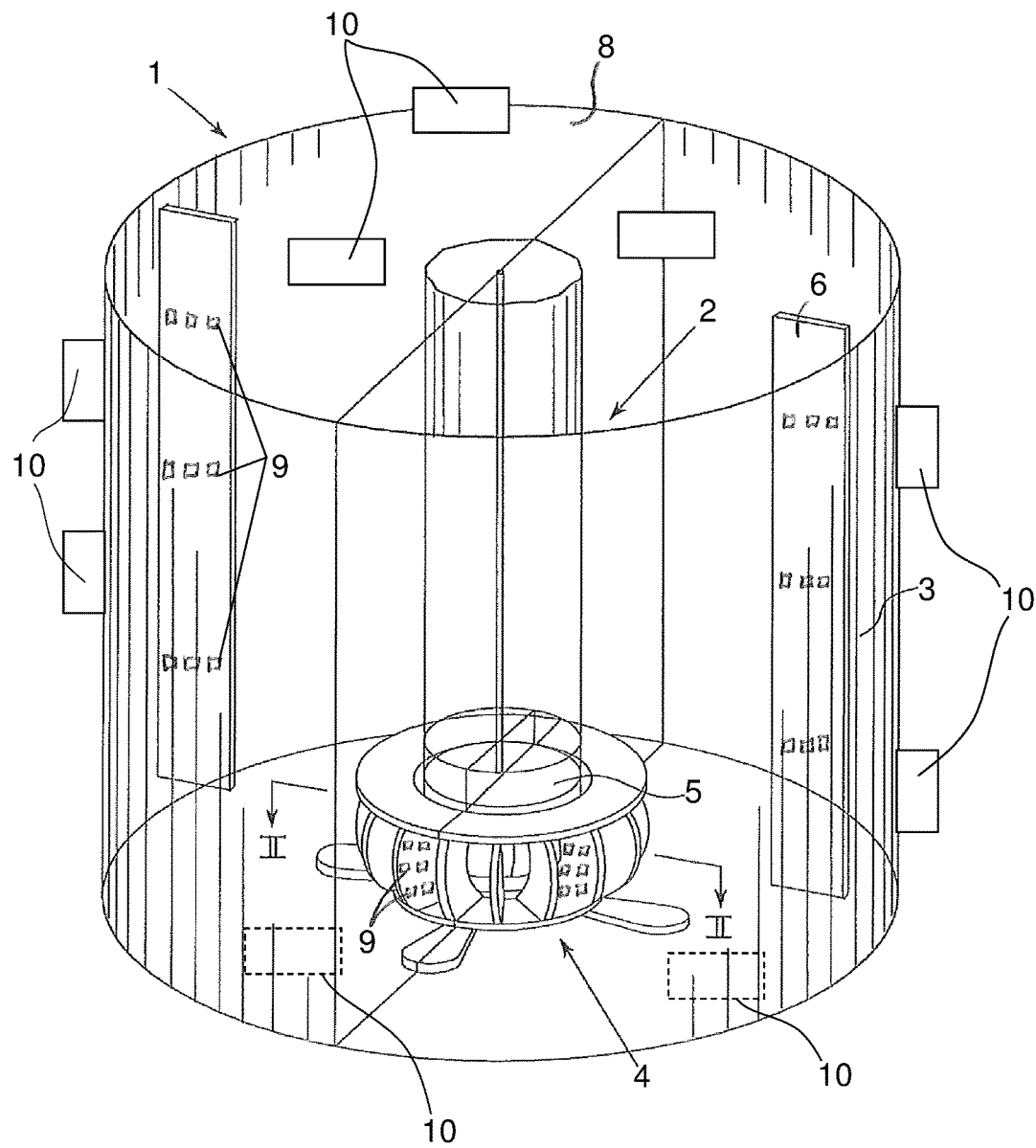
FIG. 1 is a schematic representation of a flotation cell employing certain non-limiting aspects of the invention.

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

Turning to FIG. 1, a flotation cell 1 is shown. The flotation cell 1 comprises a housing preferably lined with a liner 8. At the center of the flotation cell 1 may be provided a rotor assembly comprising a drive shaft and at least one rotors 5 thereon. The drive shaft is rotatable about its axis in a clockwise or counter-clockwise direction. The rotor 5 may be positioned (or rotors spaced) along the shaft in any manner or configuration and (as shown) may be positioned at a lower region of the flotation cell 1. In other embodiments (not shown), the rotor 5 may be positioned at a middle or upper portion of the flotation cell 1 (e.g., as does FLSmidth WEMCO® flotation machines). The flotation machine may be filled with slurry and flotation reagent from an inlet (not shown), which may be provided with a dart valve. Slurry and flotation reagent may leave the flotation cell 1 via an outlet (not shown), which may be provided with a dart valve.

The rotor assembly may be driven by a drive (not shown) comprising one or more motors. The rotor 5 may be provided to the drive shaft in any manner and may be provided in any shape, size, or configuration. The flotation cell 1 may further comprise a circumferential launder around its upper periphery which is separated from the inner surfaces of housing. One or more radial launders, or other means for froth removal may be provided, without limitation.

While not expressly shown, the drive may alternatively comprise a hydraulic drive at the expense of higher noise levels when compared to electric drives. Drive may comprise one or more gear reducers; or, due to the added expense and possible losses in efficiency, a gear reducer may be omitted in certain preferred embodiments. The motor driving the rotor may, for example, be an electric motor which may be vertically or horizontally mounted in various configurations, without limitation, and the flotation cell 1 may be configured as a short or very tall unit, or configured as a very wide or very narrow unit, without limitation.

Parts of the flotation cell 1 may be fabricated from perforated plate, solid plate, tube, pipe, forged shafts, and/or molded polymers (e.g., polyurethane), without limitation. Complete or partial fabrication may be performed on a job site, or the flotation cell 1 may be delivered as a pre-assembled single unit. In some instances, the flotation cell 1 may be broken down into few manageable units and be shipped in one or more conventional size shipping container.

The housing may be lined internally with polyurethane (e.g., liner 8). The rotor 5, stator 4, and other components of a flotation cell 1, such as baffles 6, and dip tube 13 (see FIG. 20) may be made from steel having surfaces which may be dip-coated, over-molded, or otherwise lined with rubber or other resistant material. Components may be provided with one or more detectors 9. One or more sensors 10 which are provided to the housing, liner 8, baffle 6, rotor 5, stator 4, dip tube 13 (FIG. 20), or other portion of the flotation cell 1 to monitor a status of the one or more detectors 9 and deliver information (e.g., via a network) to a control system incorporating a PLC unit. In operation, when one or more of the detectors 9 fail due to excessive wearing of the flotation components, the sensors 10 indicate that maintenance may be necessary and/or prompt an operator slow or stop the flotation cell 1 by reducing or cutting current to the motor. The exact number and particular placement of the detectors within each component of the flotation cell 1 may vary depending on how much wear information is preferred or to what extent control adjustments may be necessary. In certain embodiments shown, multiple detectors are shown in each component (shown as small squares which would be recessed or otherwise embedded within or affixed to an outer surface portion of a flotation component. A single sensor 10 may be provided and used to monitor each detector (1 for 1), or a single sensor 10 may be used to scan a plurality of detectors 9. Mobile or handheld sensors 10 may be employed as will be discussed hereinafter.

In some embodiments, the detectors 9 may comprise RFID (including LF and UHF tags) which are cast into or otherwise provided within polyurethane parts at a preset radial depth from an outermost radial profile of the respective component. In other embodiments, the detectors 9 may comprise magnets which are cast into or otherwise provided within polyurethane components at a preset radial depth from an outermost radial profile of the respective component. Sensors 10 described herein may comprise an RFID reader/interrogator's antenna or a Hall Effect sensor (in instances where the detectors 9 are configured as magnets). For example, in some instances, a sensor 10 may comprise a printed circuit board which is operatively connected to an RFID reader/interrogator antenna that transmits signals to and receives signals from a detector 9 comprising an RFID tag. The sensor 10 may further comprise a cable connecting the printed circuit board to the antennae which is positioned at some distance away from the printed circuit board. During the operation of the flotation cell 1, the one or more sensors 10 provided to the flotation cell 1 (whether outside the housing or embedded within the housing's internal polyurethane lining 8), detect the detectors 9 embedded in the various flotation components. As the components wear down, they recede to smaller dimensions. Eventually, at some point during operation, some detectors 9 may be consumed by the abrasive flotation process, at which point one or more signals provided by the detectors 9 to the sensors (and ultimately to the control system) are altered or no longer generated. Such changes in signaling indicate that one or more particular components may have worn past one or more certain predetermined amounts. Information regarding wear rates and current wear status of each component may be relayed from the sensors 10 to the control system reflecting the same in real-time—without any need to stop the operation, remove contents of the flotation cell 1, or gain physical access for visual inspection. Visual warnings such as lights (green-OK, orange-Standby, red-Caution) or audible warnings such as sirens, horns, or sound-emitting diodes may be activated to alert operators of the status of the flotation cell 1 and components thereof. Indicators to cease operation of the cell 1, modify certain operational parameters (RPM, power, flowrate) of the cell, or replace certain worn components prior to excessive component wear/failure may be provided in any conceivable fashion.

A single sensor 10 may be optionally employed on a housing portion of the flotation cell 1, suspended above the flotation cell 1, or carried by an operator and positioned to a read zone which provides a clear signal from one or more wear detectors 9. In some embodiments, one or more sensors 10 may be placed on an end portion of the housing such that detectors 9 are always within a general line-of-sight along an axis of the shaft. In this regard, sensors 10 may be able to detect the existence of detectors 9 without interruption or interference. Such end-mounted (e.g., top-mounted) sensors 10 may be circular or ring-shaped—or otherwise arranged in ring formations to better track the annular path of detectors 9 within the rotor 5 as they rotate about the shaft axis. Sensors 10 may comprise the capability to monitor various different RFID or UHFID frequencies, and the detectors 9 may comprise different transponders which resonate/signal at different frequencies. In some cases, all detectors 9 on a single component may comprise a similar first operational frequency, and all detectors 9 on another component may comprise a similar second operational frequency which is different from the first operational frequency. In other cases, all detectors 9 may operate on the same general frequency, and a sensor 10 may identify each detector 9 based on its own unique identification (UID). For instance, detectors 9 may comprise unique RFID tags, and a sensor 10 may comprise a reader/interrogator and antennae tuned to a specific carrier frequency which may read the RFID tags which are tuned to said specific carrier frequency. In such instances, multiple carrier frequencies between components may optionally not be employed. In certain embodiments, detectors 9 which are located further from the sensor 10 may operate on higher frequencies than detectors 9 which are located closer to the sensor 10, in order to improve range and mitigate interference. In further non-limiting embodiments, all radially-innermost detectors 9 may operate on a first frequency, all radially-outermost detectors 9 may operate on a third frequency, and all centrally-disposed detectors within the components may operate on a second frequency, wherein each of the first, second, and third frequencies may be different from each other. Frequency and number of detectors 9 may be a function of axial (i.e., height positioning) within the cell 1, or a function of circumferential (i.e., angular location) within the cell 1.

Figure 7A:
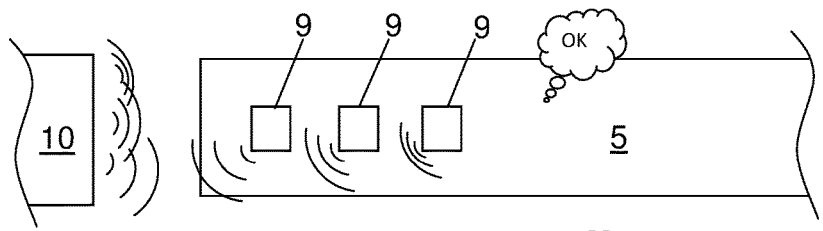
FIGS. 7a-7e schematically illustrate how a wear detector embedded in a flotation cell component may be utilized to alert an operator of minor to extreme wear according to some embodiments.
Figure 7B:
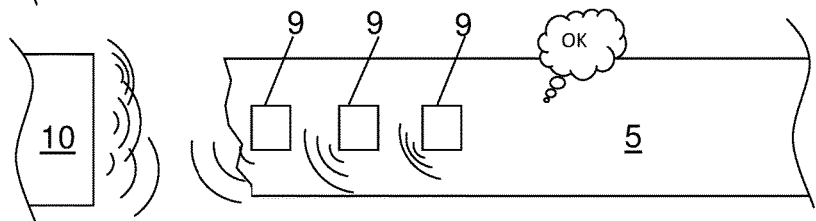

FIGS. 7*a*-7*e* sequentially show one possible example of a time lapse wear scenario for a particular component within a flotation cell. Turning to FIG. 7*a*, a component may initially comprise three detectors 9—each operating at different RFID or UHFID frequencies. In use, a nearby sensor 10 provided in the form of an RFID or UHFID reader/interrogator may produces a first check signal, a second check signal, and a third check signal. The detectors 9 reflect or otherwise relay first, second, and third confirmation, respectively. FIGS. 7*a* and 7*b* show instances where all three detectors 9 are fully-operational and intact, and so produce all three of the confirmation signals. In these instances, a sensor 10 will relay an OK status to the control system for the flotation cell 1.

Figure 7C:
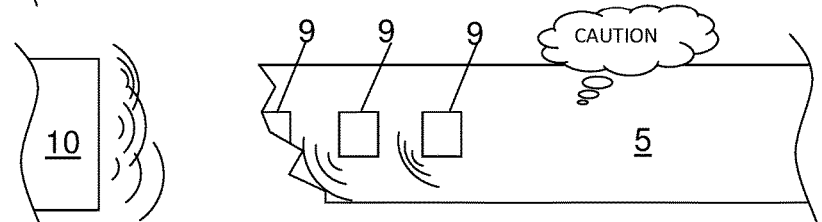
Figure 7D:
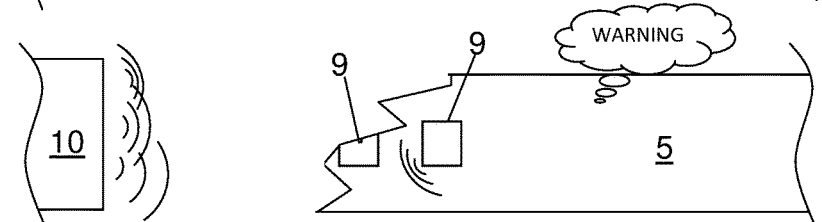
Figure 7E:
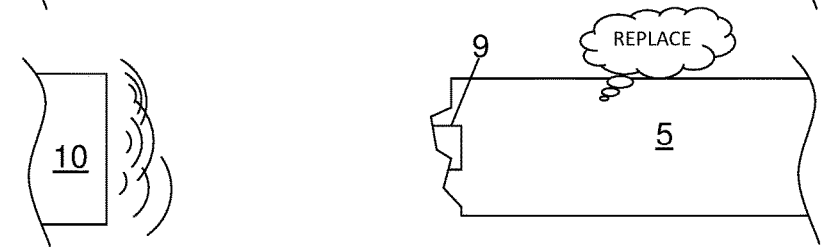

FIG. 7*c* shows an instance where an outermost first detector 9 is being consumed by wear and is pulverized by the slurry within the housing. In this instance, the outermost first detector 9 loses its functionality and therefore will not respond to the first check signal. Accordingly, the outermost first detector 9 does not produce a first confirmation signal to the sensor 10, and the sensor 10 conveys this information to the control system, wherein a caution flag may be issued. As shown in FIG. 7*d*, both the outermost first detector 9 and the middle second detector 9 are consumed by wear. In this instance, the middle second detector 9 also loses its functionality and therefore does not respond to a second check signal. Accordingly, only the innermost third detector 9 produces a third confirmation signal to the sensor 10. With no first or second confirmation signals being received by the sensor 10, and only one third confirmation signal being received by the sensor 10, a warning flag may be issued. Caution/warning flags may comprise the delivery of acoustic or visual stimuli to the machine operator (e.g., via siren or colored lights), or they may comprise the delivery of electronic signals from the sensor 10 to a programmable logic controller (PLC) or central processing unit (CPU) in the control system which controls the operation of the flotation cell 1. FIG. 7*e* shows a situation where the component is severely warn and replacement is required. In such an instance, all of the first, second, and third detectors 9 have been consumed by wear. In such an instance, none of the first, second, or third confirmation signals are received by the sensor 10, and a warning flag indicating that maintenance is required may be issued.

In yet other embodiments of the invention, each component may comprises only a single detector 9. It may be preferable to locate the relative positioning of a detector 9 within each component differently depending on a function of the component, or depending on the component's location within the flotation cell. For example, the position of a detector 9 within a particular component may be a function of how fast said particular component typically wears out, or a function of how critical a surface geometry of a component is to performance, efficiency, or recovery. In another example, a position of a detector 9 within a particular component or location within the cell 1 may change as a function of the component's position along the shaft (i.e., in relation to the vertical axis of the flotation cell as a whole), the component's position along a radial axis of the flotation cell as a whole, the component's position along a circumferential/periphery of the flotation cell as a whole, or the like. For instance, in the non-limiting example shown, one or more components which are more prone to wear may each be provided with a detector 9 located further inwardly from an outer component surface than a detector 9 of one or more components which are less prone to wear (so as to reduce constant alarms under normal wearing conditions).

Moreover, a single sensor 10 may comprise an RFID or UHFID reader/interrogator which can operate on multiple frequencies. A first check signal, a second check signal, a third check signal, a fourth check signal, and a fifth check signal may be produced. A first component may be outfitted with a detector 9 capable of operating on the same frequency as the first check signal; a second component may be outfitted with a detector 9 capable of operating on the same frequency as the second check signal; a third component may be outfitted with a detector 9 capable of operating on the same frequency as the third check signal; a fourth component may be outfitted with a detector 9 capable of operating on the same frequency as the fourth check signal; and, a fifth component may be outfitted with a detector 9 capable of operating on the same frequency as the fifth check signal. The detector on the first component is worn away and therefore, it does not produce a first confirmation signal or an equivalent response to sensor 10. Therefore, a control system would be informed that the first component needs replacement and an operator would be alerted of the same. The detectors 9 in the second through fifth components would still provide second, third, fourth, and fifth confirmation signals, respectively. Therefore, a control system would report a status of each of the second, third, fourth, and fifth as being fully operational.

Figure 8:
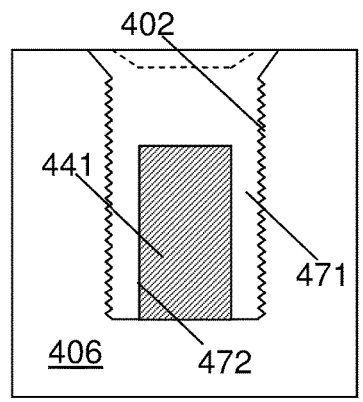
FIGS. 8-13 schematically illustrate different ways a wear detector may be provided to a flotation cell component according to various embodiments.
Figure 9:
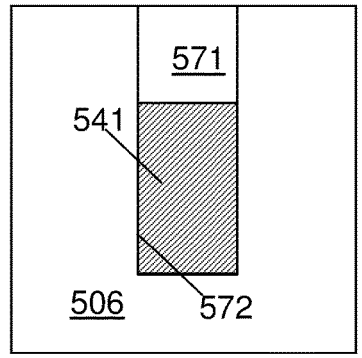
Figure 10:
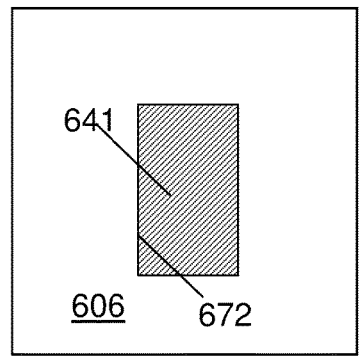
Figure 11:
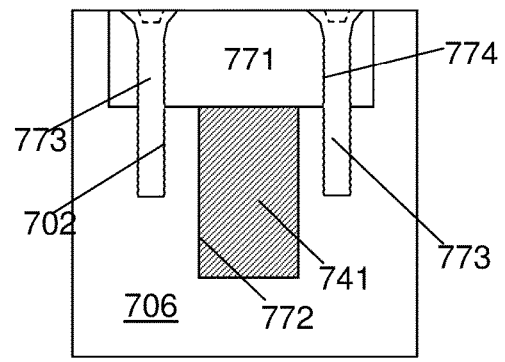

FIGS. 8-13 suggest various, non-limiting methods of embedding a detector 441, 541, 641, 741, 1541A, 1541B in a flotation cell 1 component 406, 506, 606, 706, 1506A, 1506B. As shown in FIG. 8, a threaded insert 471 having a cavity 472 therein may be threaded into a threaded receiving portion 402 provided in a component 406 in order to capture a detector 441 therein. Alternatively, as shown in FIG. 9, a detector 541 may be placed into a cavity 572 within a component 506, and a cover plug 571 may be placed over it and glued, welded, or otherwise bonded to the rest of the component. While not shown, cover plug 571 may incorporate several snap fit features, or the cover plug 571, itself, may be a snap-fit fastener which complimentarily mates with features provided in the component 506. Moreover, portions of the component 506 surrounding the cover plug 571, or portions of the cover plug 571 may comprise surface textures, grooves, channels, or protuberances for improved friction or to allow ingress of bonding means such as an adhesive. Even more alternatively, as shown in FIG. 10, a detector 641 may be embedded in a cavity 672, co-molded with, or cast into polymer (e.g., polyurethane) component material to form a component 606. Furthermore, as suggested in FIG. 11, a cover cap 771 may be placed over a cavity 772 in a component 706 in order to capture a detector 741 therein. The cover cap 771 may be provided with at least one aperture 774 configured to receive and retain fastening means 733 which engages at least one threaded receiving portion 702.

Figure 12:
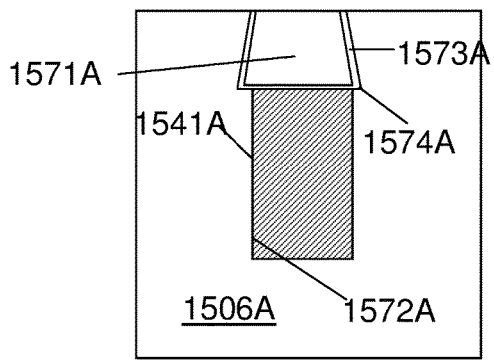
Figure 13:
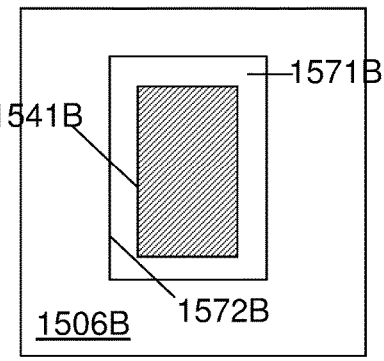

As shown in FIG. 12, a detector 1541A may be placed into a cavity 1572A within a component 1506A, and a tapered cover plug 1571A may be placed over it and glued, welded, or otherwise bonded to the rest of the component 1506A with bonding means 1573A. While not shown, tapered cover plug 1571A or surrounding portions of the component 1503A may be textured for improved friction or to provide bonding means 1573A with larger contact surface area. Furthermore, while not shown, channels or protuberances may be provided on outer surfaces of tapered cover plug 1571A to allow ingress of bonding means 1573A. While in the particular embodiment shown, the tapered cover plug 1571A comprises a reverse (i.e., undercut) taper, the tapered cover plug 1571A may alternatively comprise a lead-in taper. In some preferred embodiments, a reverse taper comprising between approximately 0 and 2 degrees may be employed. The tapered cover plug 1571A may be inserted with force into a complimentary tapered cavity 1574A provided to the component 1506A as shown, in order to provide additional pull-out resistance. As shown in FIG. 13, a detector 1541B may be overmolded to form a plug 1571B which may then be placed into a mold. The component 1506B may be molded with the plug 1571B to capture the plug 1571B within a cavity 1572B within the component 1506B.

Figure 14:
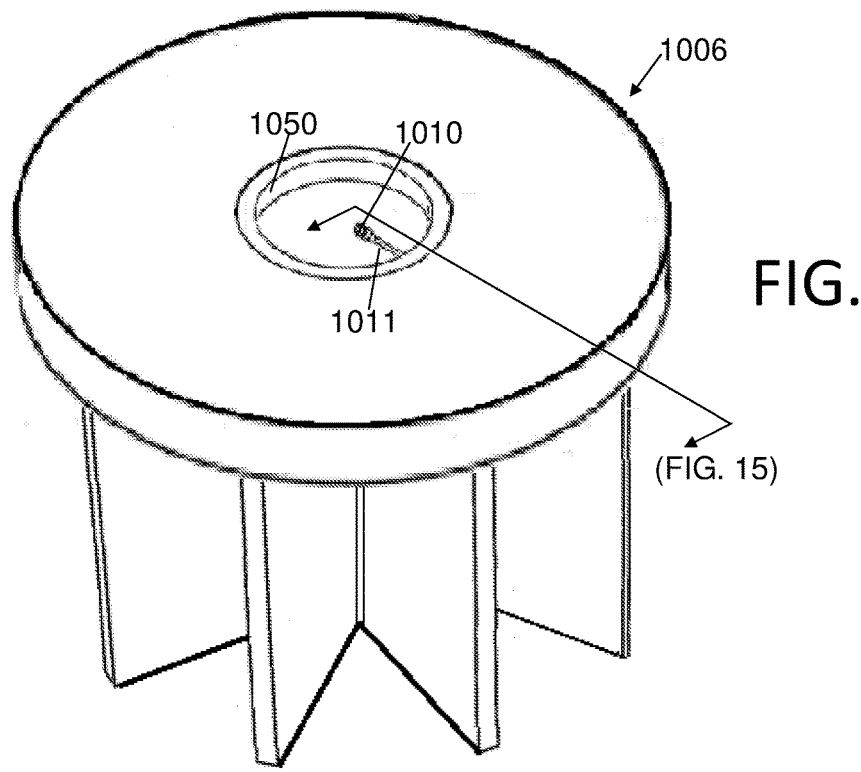
FIG. 14 is a schematic isometric view showing a wear detector in the form of a circuit board disposed within a rotor according to yet even other embodiments.
Figure 15:
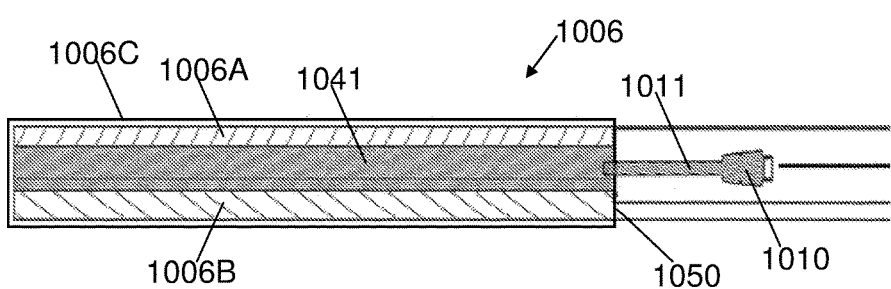
FIG. 15 is a cross-section showing the wear detector embedded in a portion of the rotor of FIG. 14.

According to yet other embodiments such as the one shown in FIGS. 14 and 15, detectors 1041 may be configured to work with a sensor that is provided within a shaft of the flotation cell 1 or otherwise operatively-connected to a rotating shaft. Accordingly, data may be received from the detector 1041 without interruption from intermittent tangential passes with each orbit of the detector 1040. In such cases, a rotor component 1006 may comprise a wafer-style wear plate detector 1041 provided between a first sandwich portion 1006a and a second sandwich portion 1006b. The composition may be covered with or subsequently overmoulded with an optional outer polyurethane coating 1006, or the detector 1041 may be placed in a mold that is filled with polymeric material to form the entire rotor component 1006. The first sandwich portion 1006a and/or the second sandwich portion 1006b may comprise pre-formed polymer components (e.g., polyurethane) which are bonded or otherwise mechanically joined to each other to form a single-piece rotor component 1006 or portion thereof. A wire 1011 extending from the wear plate 1041 may communicate with a sensor (not shown) via a hard-wired connection 1010.

Figure 16:
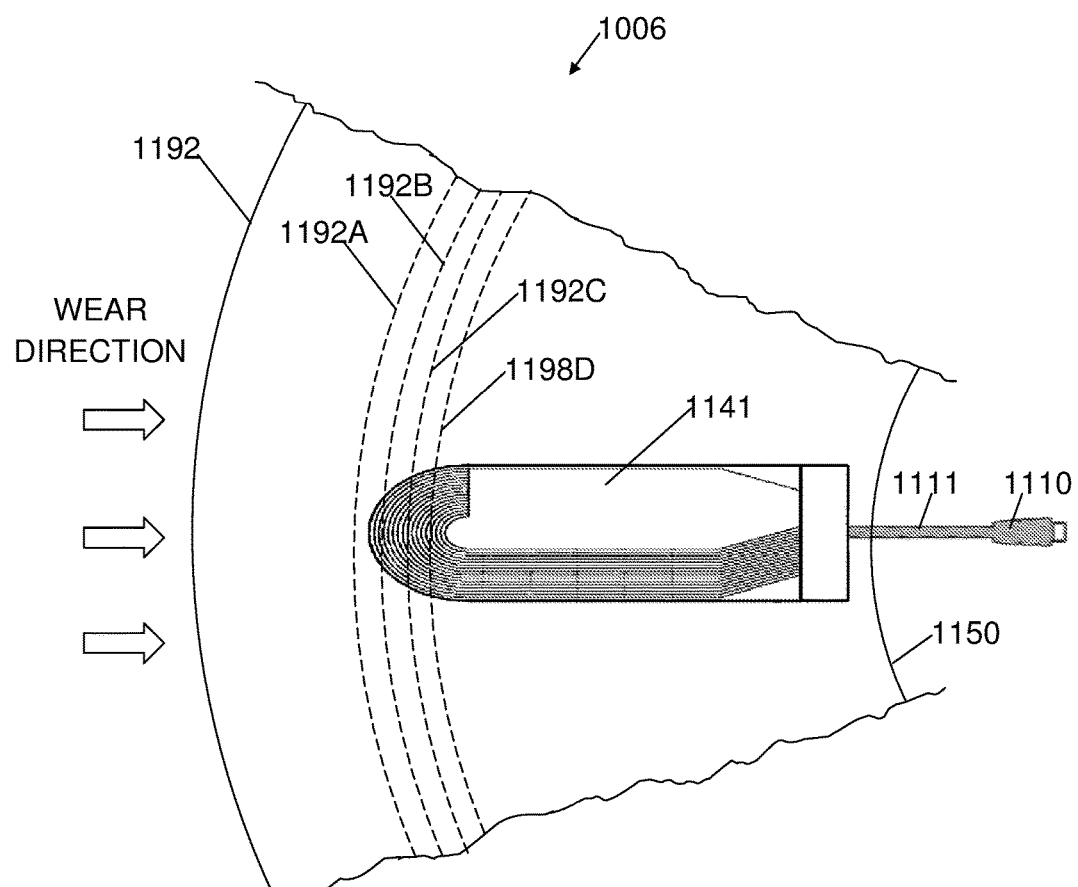
FIG. 16 shows a top plan view of a rotor having a wear detector as shown in FIGS. 14 and 15 (and which may also be incorporated into a stator, baffle, dip tube, crowder, or liner, without limitation)
Figure 17:
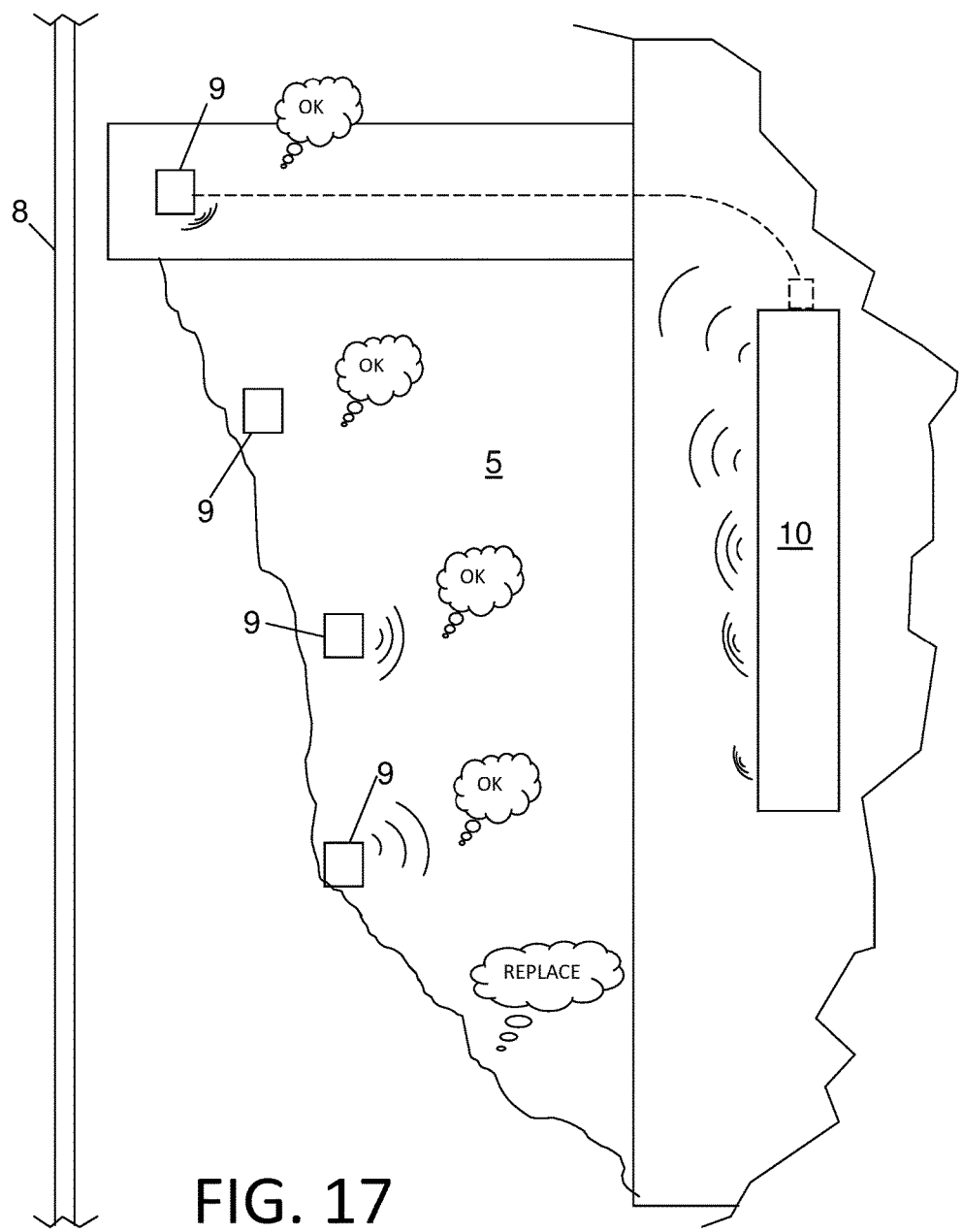
FIG. 17 schematically shows how wear detectors may be worn away over time, in particular, when installed in a rotor component of a flotation cell.

According to further embodiments, as shown in FIG. 16, a flotation cell component 1106 may comprise a probe-style wear detector 1141 having a series of parallel circuits, to which a known voltage is applied. The detector 1141 may be placed within the component 1106 at a predetermined spaced distance from an outer edge 1192 or surface portion when new. In use, as wear on the component 1106 progresses to a first wear line 1192a, no measurable changes are detected by the detector 1141 since the current in each of the circuits remains the same. Accordingly, a sensor (not shown) connected to the detector 1141 via a wire 1111 and hard wire connector 1110 would not indicate a change in operational status to a control system and would not trip an alarm. However, as wear progresses further, to a second wear line 1192b, outer portions of the detector 1141 will begin to erode away, disrupting outer-most circuits within the detector 1141. This, in turn, causes currents the remaining circuits of the detector 1141 to change. As wear continues to the third 1192c and fourth 1198d wear lines, the current through each remaining intact circuit may substantially increase until it exceeds a preset threshold or the detector 1141 ceases to function properly at all—at which point maximum recommended wear has been realized. The selected preset threshold should be indicative of a proper time to replace the component 1106 based upon its outermost dimensional profile 1192 when new, and/or engineering requirements. When selecting a preset threshold, careful consideration should be given to achieve maximum use life of a flotation component without negatively affecting efficiency.

In some embodiments, both the wafer-style 1041 and probe-style 1141 detectors may be comprised of specialized very-thin printed circuit boards (PCBs) which may be waterproof to IP 68 and may operate at temperatures between −20° and +80° C. A power supply (e.g., 12 VDC with a 20 mA maximum current) may be employed to power the detectors 1041, 1141 directly, or the detectors 1041, 1141 may be powered indirectly via a serial bus with the sensor, control system, or network. Other voltages and currents are envisaged, depending on the specifications of the particular detector being used. In some instances, power may be supplied to the detectors 1041, 1141 via a combined power & data cable which connects to a sensor, control system, or network. Alternatively, the detectors 1041, 1141 may be stand-alone battery-operated devices that communicate with a sensor, control system, or network via ZigBee® wireless standards (802.15.4), or other wireless protocol (e.g., an IEEE 802.11-based standard). Portions of the sensor, control system, or network may be provided within a rotating shaft of the flotation cell 1, or otherwise operatively-connected to a rotating shaft via a brush-type contact or similar arrangement commonly used in electric motors. Moreover, portions of the sensor, control system, or network may be provided within or to inner or outer portions of the housing or liner 8 without limitation.

A human machine interface (HMI) computer may be provided to serve as the gateway between the detector/sensor hardware and larger flotation circuit/plant operations. The HMI computer may have multiple network interfaces—for instance, at least one for a dedicated flotation cell component wear-monitoring network, and at least one for the entire flotation circuit/plant network. Alternatively, the HMI computer may run completely independently of any flotation circuit/plant network. One or more software components may be installed on the HMI computer which will allow it to perform all the necessary functions for display, analysis, and alarm management, as well as data reporting and historian functions. Input processing may be facilitated by "unsolicited" transmissions from each sensor 10 with data corresponding to detectors 9, and therefore, each sensor 10 may have its own unique ethernet (IP) address and may communicate via a dedicated ethernet network to the HMI computer/control room PC. Data may be retrieved from the detectors 9, and accumulated in each sensor 10 until a set interval, at which point the sensor 10 may send a block of data to the HMI computer/control room PC. Software on the HMI computer or control room PC may intercept the block of data, and "unpack" it into OPC tags which can be made available to all other internal and external users. Data points stored in the OPC tags may be configurable, and can be logged to a SQL database for future analysis. A data historian and analysis console may be made available for the review of past component wear performance. With such a console, data may be compared visually in a large number of different two-dimensional and/or three-dimensional charts and graphs. Data may also be provided in its raw format, for viewing and copying for export to other programs. Data can be retrieved for one or many detectors, sensors, flotation cells, hardware units, or flotation circuits. In some embodiments, the time period of the aforementioned interval can be selected, from a few minutes to as long as the system has been in operation, provided there is adequate hard drive space for the data. An alarm manager may also be provided if customized and detailed alarm control is desired from the HMI computer. For example, a "basic" alarm mode may be provided as a default, wherein a visual display client shows various components of a schematic rotor assembly, rotor 5, stator 4, baffle assembly 6, liner 8, dip tube 13, or the like, changing colors from green, to yellow, to red, depending on the condition of the detectors 9 therein. Levels and thresholds may be preselected and defined during system configuration. Advanced alarm management may also be provided, wherein once active, alarm conditions can be set with delays, escalations, or even sequences of conditions. Responses can vary from simple messages to external (e.g., email notification, pager notification, cell phone/text, etc.) communications. Real-time data and system status may be displayed on the visual display client, which can be viewed from the HMI computer, or from any other CPU on the plant's network which can access the OPC data on the HMI computer. The visual display client may display plant-wide status views with color codes for overall flotation circuit status, flotation cell status, flotation component status, detector 9 status, or sensor 10 status. In some embodiments, any sensor 10 and/or detector 9 can be selected for individual viewing with a mouse click from within the visual display client. Sensor views may show individual detector 9 readings for each component, with colors indicating status and current or past performance (e.g., current or past wear rate, current wear amount, current diameter/radius/width, height, thickness, dimension, or expression of % life remaining). In addition, individual components can be selected, using mouse clicks, to display detailed status information for those readings which are not normally displayed on other higher-level views (such as the overall flotation circuit operation views and/or flotation cell operation views). A rolling graph may be displayed, which, in certain embodiments may show trends for up to 24 previous hours or more. Communication services may be provided which output OPC tag values to, for example, a CHIP or PI system, or another OPC capable server. The tags can be individually selected for output, and the names of the tags on the target system can be specified for each tag. Alternately, an external OPC server capable of soliciting communications using OPC/DA can request the tag data from the HMI computer directly. OPC "Tunneling" programs, such as Matrikon, PI Tunneler, or OPC Mirror (provided by Emerson Process management), may further be used to establish secure links to the HMI computer in order to retrieve data.

In some embodiments, sensors 10 may collect and process data from the detectors 9 installed in the flotation cell 1 components periodically (e.g., every 5 or 10 seconds) and communicate the data to a controller (e.g., HMI computer) on its data bus. Depending on the type of detectors 9 used, sensors 10 may provide power, data acquisition, data processing, and configuration/optimization capabilities. Detector-to-sensor communication may be either cabled or wireless, with up to several detectors 9 (of various types) per sensor 10. In some non-limiting embodiments, sensors 10 may be housed in a factory-sealed polymeric box exceeding a UL94-HB flammability rating and means for mounting may be provided to the box for mounting to various components of a flotation cell 1, such as to a housing. In some non-limiting embodiments, sensors 10 may hold up to NEMA 4X/IP 65 tests, operating temperatures from −20° to +60° C., and storage temperatures ranging between −40° C. and +80° C. In some non-limiting embodiments, sensors 10 may run on 12 or 24 VDC (0.2 Amp) isolated power supplied through a bus cable. Sensor bus communications/ data protocols may comprise an RS-485 multidrop network with 15 KV ESD and transient protection. In some embodiments, shielded DeviceNet cables may connect sensors with up to 16 components per flotation cell 1 or flotation circuit. Means may be provided to allow firmware to be field-upgraded using built-in bootload capability.

One or more sensors 10 may be provided to the shaft, rather than housing. Wireless RFID or UHFID communication can be made between one or more detectors 9 located on one or more flotation components and the one or more sensors 10. Alternatively, hardwired connections similar to the ones shown in FIGS. 14-16 and described above may be optionally utilized. In some embodiments, the wires may comprise shielded cables, waterproof cables, chemical tolerant cables, and/or abrasion-resistant cables which connect one or more detectors 9 to the more sensors 10 as shown. Alternatively, the hardwired connection may be made directly with an adjacent control system/network which incorporates the functionalities of a sensor 10. In some embodiments, hardwired connection may comprise USB (e.g., standard, mini, or micro plugs) or other type of serial bus connections. While not shown, the bus hardwired connections 1211 may incorporate daisy-chain geometries between adjacent components to minimize cable runs through the shaft, liner 8, housing, baffle 6, dip tube 13, stator 4, etc. . . .

Regarding controls, one or more tactile dome switches may be provided on a front overlay of each sensor to provide entry and navigation for a sensor configuration mode. Such means may provide the setting of a sensor address (e.g., #1, 2, 3, . . . , N) as well as customization and optimization of all detectors connected to that sensor. The sensor may remain attached to the bus throughout configuration, and in most instances, should not likely interfere with normal operation of other sensors.

Figure 18:
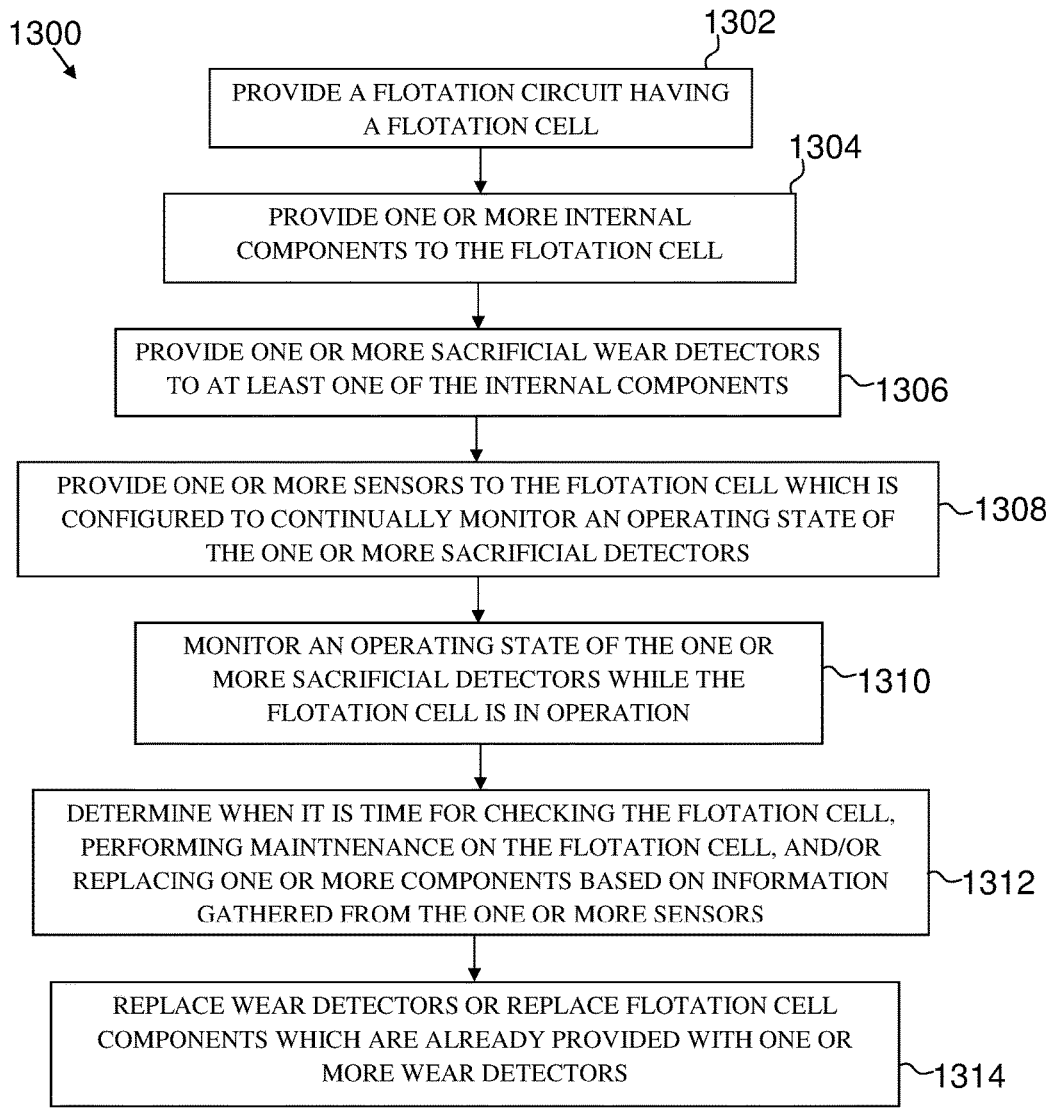
FIG. 18 schematically illustrates a method of operating a flotation circuit and/or monitoring wear of a flotation cell according to some embodiments.

FIG. 18 schematically illustrates a method 1300 for the continuous monitoring of wear in flotation circuits according to some embodiments. The method 1300 includes the steps of providing a flotation circuit 1302 having at least one flotation cell, providing 1304 one or more flotation cell components to the flotation cell, providing 1306 one or more sacrificial wear detectors to at least one of the components in any number or fashion, providing 1308 one or more sensors to continually monitor an operating state of the detectors provided, monitoring 1310 the state of the detectors while the flotation cell is operating, determining 1312 when it is an appropriate time to repair, replace, or check a component or otherwise modify operational parameters based on information provided from the detectors and sensors, and attending 1314 to the problem with the correct solution (e.g., replacing a worn component (s) or slowing the machine RPM down).

A visual client display may be utilized when practicing the invention. The display may comprise an image which is representative of a rotor, stator, baffle, dip tube, liner, or other component in a flotation cell, a status icon indicating an overall condition of the respective component(s), one or more icons indicating a status of the controller, a graph showing real-time wear for each relevant component, a set of component number icons, a set of component status icons, and an icon showing the overall condition of a sensor. For example, the visual client display may suggest that the #4 vane of a stator of the #2 flotation cell in a bank of cells needs replacement via a red status icon and an indication of 0% wear life remaining. In another example, the visual client display may suggest that a #5 baffle in the first rougher cell is starting to wear faster than normal and needs replacement via a red status icon and an indication of 0% wear life remaining. In still other examples, the client may suggest that a #6 and #2 blade of a rotor is starting to wear, the rest of the blades are significantly worn, and that a maximum gap clearance between the rotor and stator has been exceeded and will soon need replacing by showing a yellow status icon and an indication of 60% wear life (e.g., 44 inches of diameter) remaining.

Figure 19:
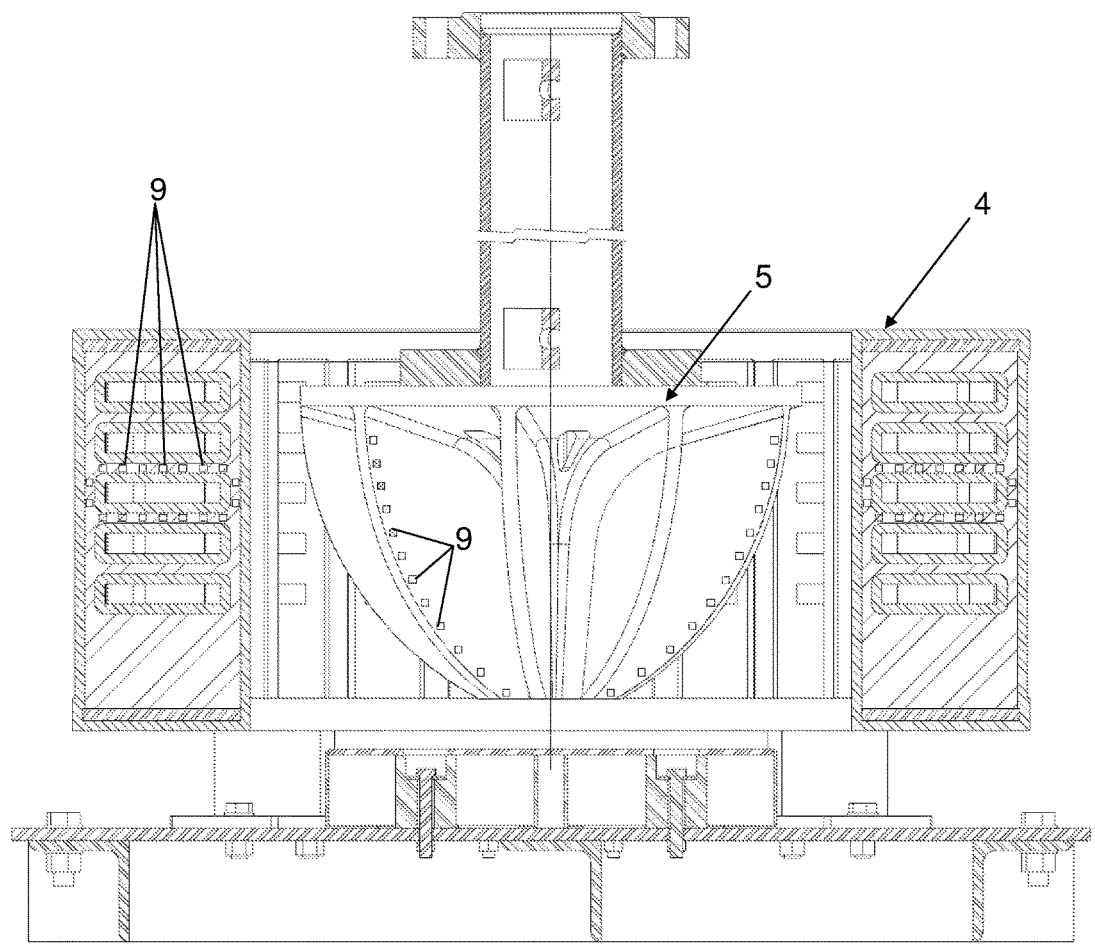
FIG. 19 is a cross-sectional view of one non-limiting example of a rotor-stator combination which may employ wear detectors described herein; and, FIG. 20 is a cross-sectional view of one non-limiting example of a dip tube and rotor which may employ wear detectors described herein.
Figure 20:
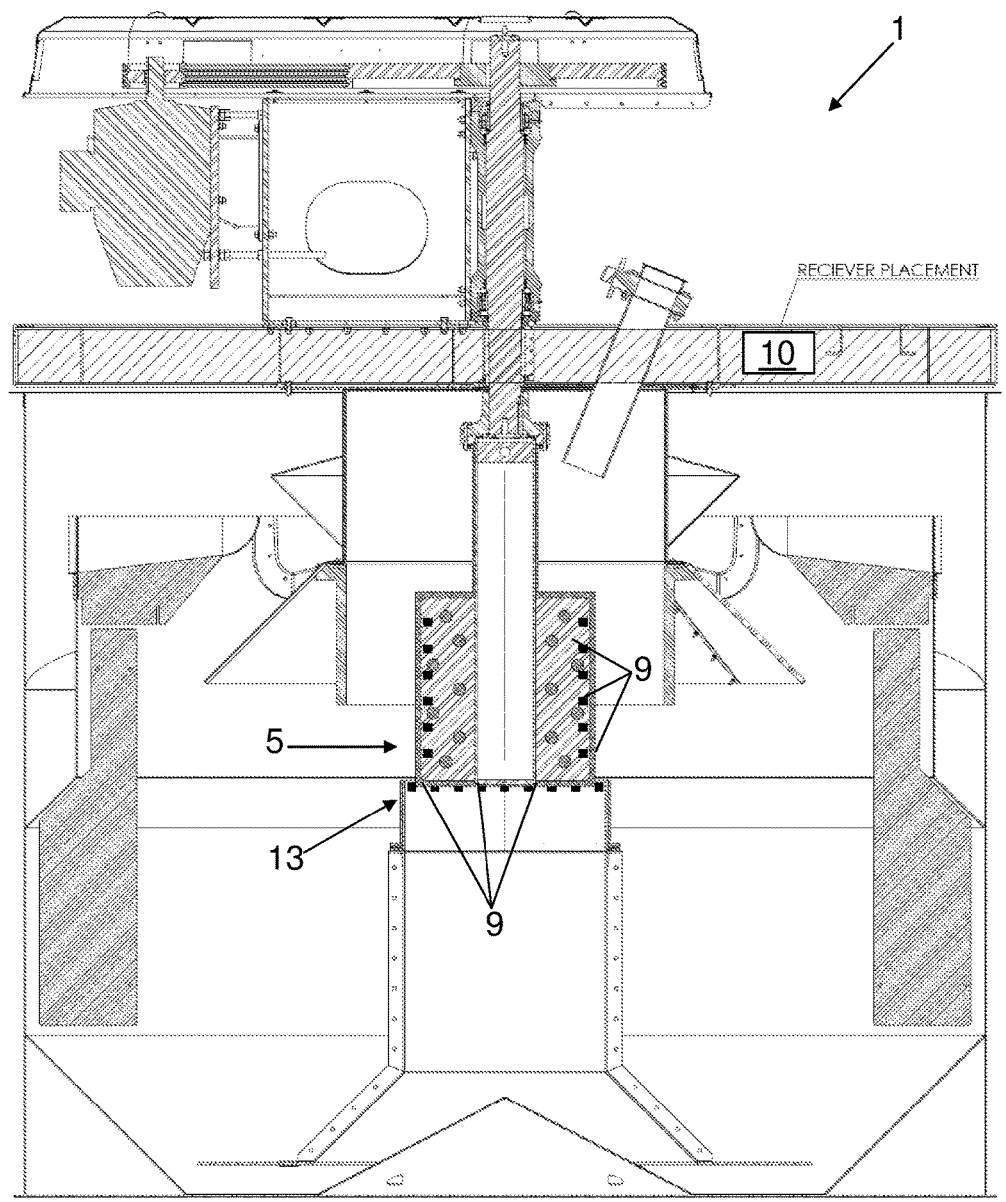

FIGS. 19 and 20 show further embodiments of a "smart" flotation cell according to yet further embodiments, showing further patterns and arrangements of detectors 9 disposed in various flotation components. The images are fairly self explanatory. Detectors 9 are strategically placed in problematic zones where jets and flow are concentrated (i.e., "problematic zones"). In this regard, the problematic zones can be monitored to ensure that a floatation cell 1 is operating at its best efficiency by running the apparatus within its manufacturer-recommended specifications.

Although the invention has been described in terms of particular embodiments and applications, one of ordinary skill in the art, in light of this teaching, can generate additional embodiments and modifications without departing from the spirit of or exceeding the scope of the claimed invention. For example, while it is envisaged that the invention may have the most practicality with production-sized flotation cells which are sized 50-100 m(^3) and up, various aspects of the invention (whether alone or in combination) may be incorporated in a lab-sized or pilot plant unit-sized flotation cell (e.g., <50 m(^3)). Detectors discussed herein may comprise active reader passive tags (ARPT), active reader active tags (ARAT), or battery-assisted passive (BAP) tags without limitation, and they may operate at any preferred frequency within any useable band including: LF (120-150 kHz) for distances between detectors and sensors under 0.1 meters, HF (13.56 MHz) for distances between detectors and sensors under 1 meters. The detectors discussed herein may also operate within the UHF (e.g., 433 MHz, 865-868 MHz, or 902-928 MHz) or microwave (2450-5800 MHz) spectrums for much larger distances between detectors and sensors. In some embodiments, the detectors discussed herein may comprise multi-frequency (MF) RFID tags, and the sensors discussed herein may comprise a multi-frequency reader. In some embodiments, detectors discussed herein may comprise self-powered RF-emitting wireless micro-transmitters (e.g., comprising radio-isotope batteries), and sensors discussed herein may comprise receivers tuned to the same frequency as said RF-emitting wireless micro-transmitters. In some embodiments, data may be provided in a programmable automation controller (PAC) or programmable logic controller (PLC) that is addressable from a plant control network. In such instances, OPC (i.e., object linking and embedding OLE for process control) and the high overhead/complexities of distributed component object model (DCOM) configurations may be avoid by using other common protocols such as Ethernet/IP, Modbus (RTU-, ASCII-, or TCP-frame formats), and/or combinations thereof (e.g., Modbus TCP/IP open-mbus).

Figure 2:
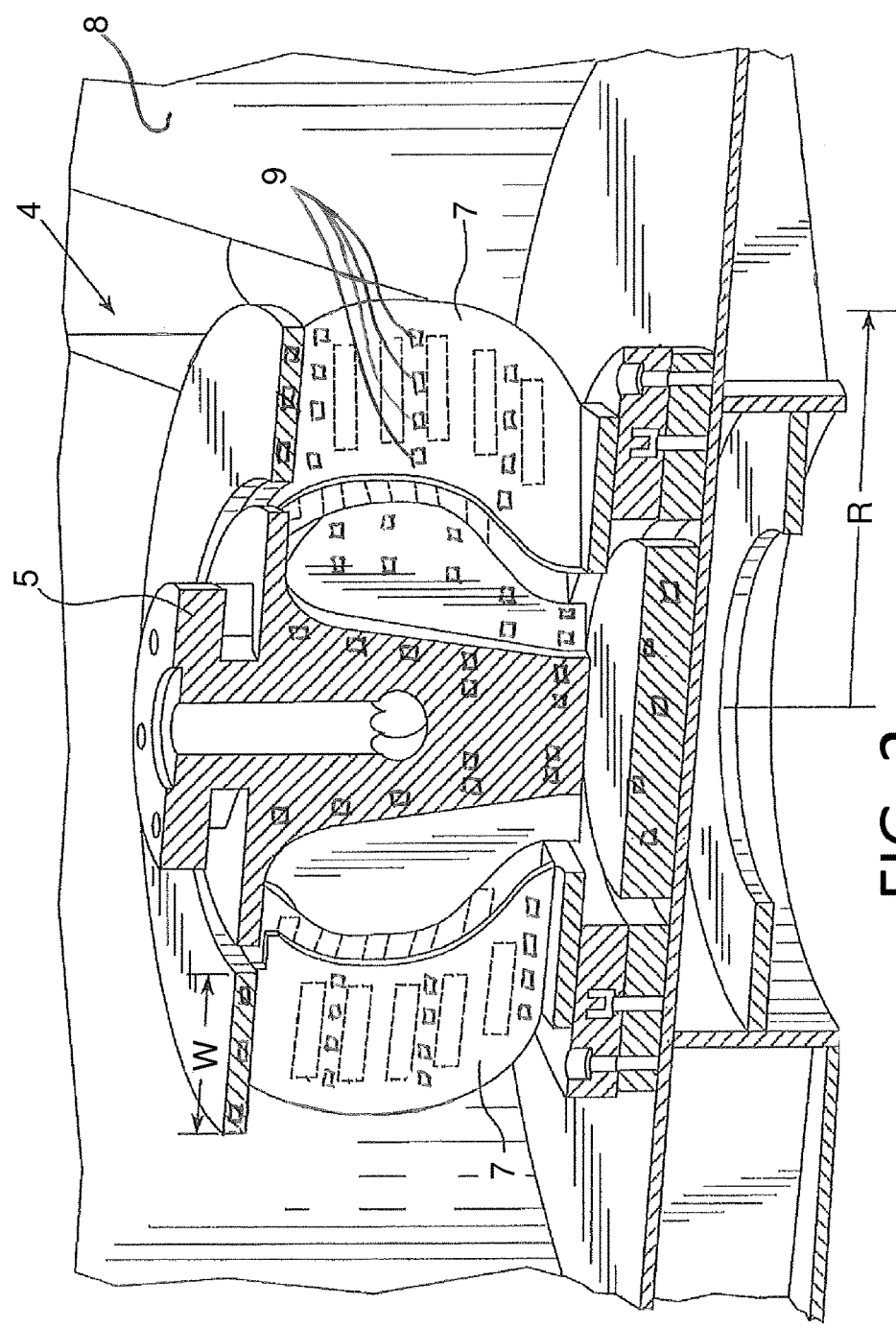
FIG. 2 is a schematic representation of a rotor and stator employing certain non-limiting aspects of the invention.
Figure 3:
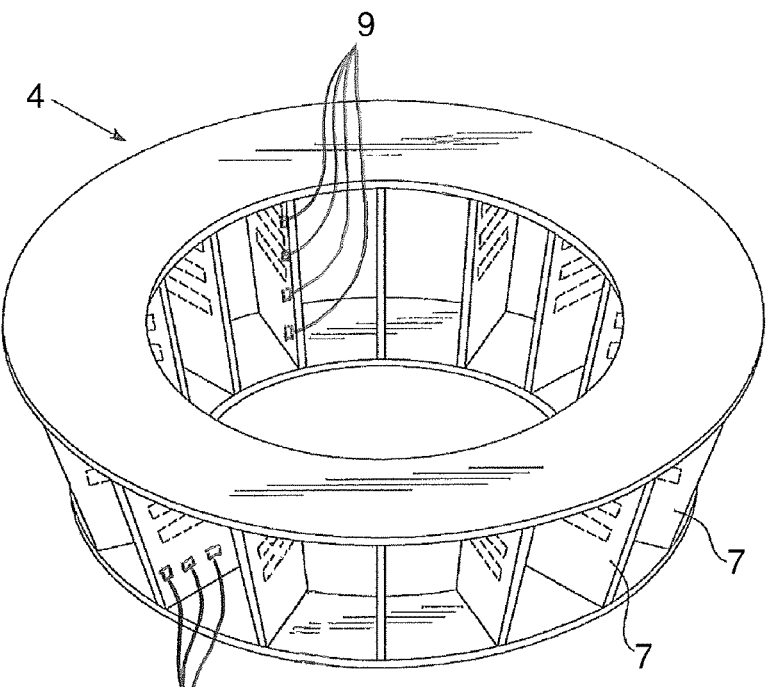
FIG. 3 shows a stator component for placement within a flotation cell according to some embodiments.
Figure 4:
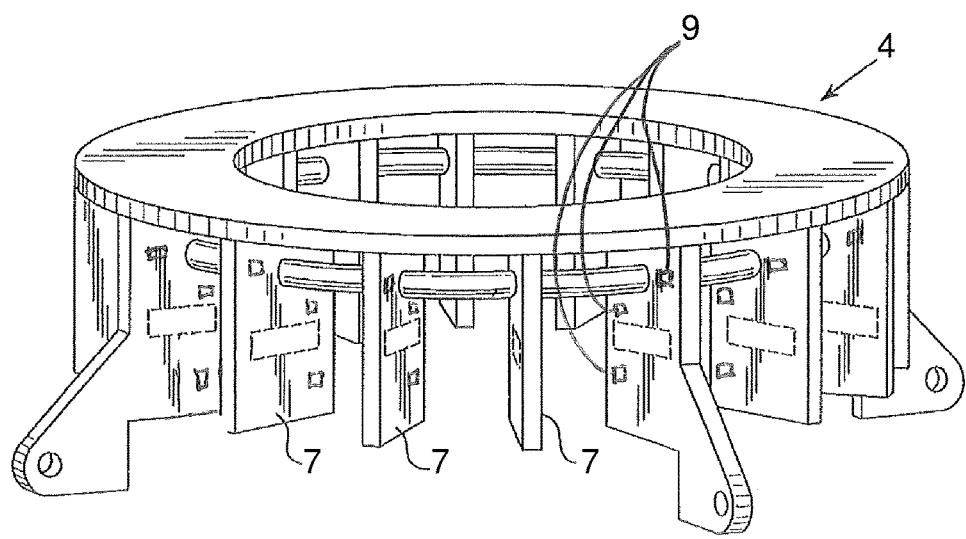
FIG. 4 shows a stator component for placement within a flotation cell according to some embodiments.
Figure 5:
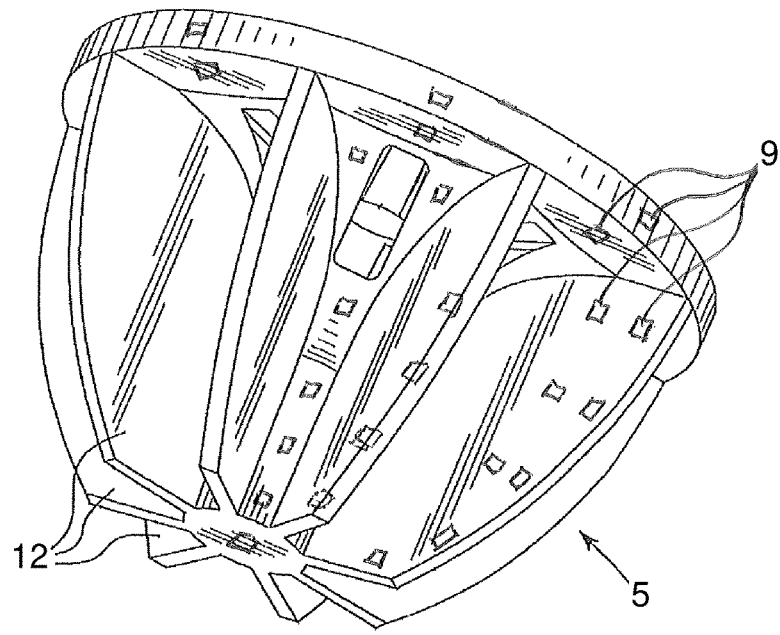
FIG. 5 shows a rotor component for placement within a flotation cell according to some embodiments.
Figure 6:
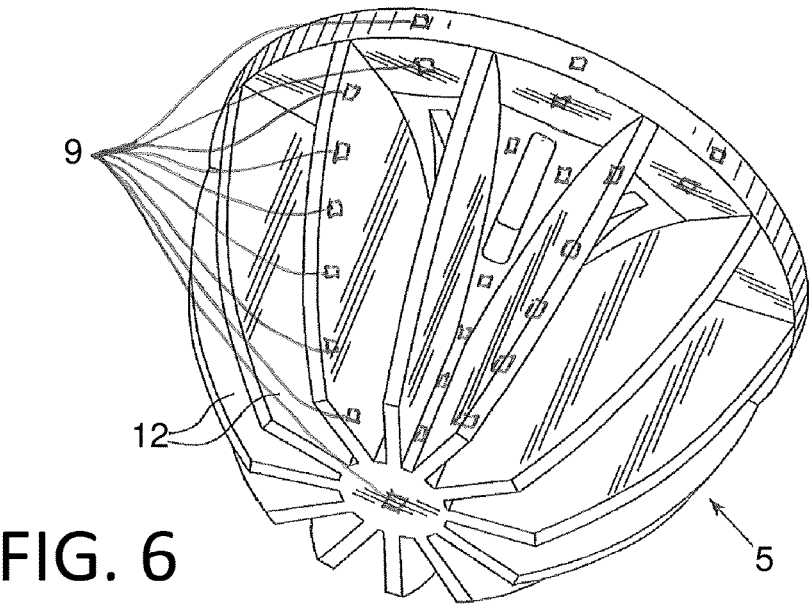
FIG. 6 shows a rotor component for placement within a flotation cell according to some embodiments.

It should be further noted that the particular geometries of components shown in the drawings are merely schematic representations and may vary from what is shown, and it is anticipated by the inventors that any number of variations and/or combinations of features or elements described herein may be practiced without departing from the scope of the invention. For example, while multiple detectors 9 may be shown as being arranged in a generally radial alignment within a rotor 5, stator 5, dip tube 13, baffle 6, etc., they may be alternatively or also aligned in a direction generally parallel to the shaft axis, or randomly so as to detect a reduction in thickness, dimension, or change in profile of a flotation component as well as a reduction in diameter of a rotor, or reduction in width "W" or change in dimension radially "R" (as defined in FIG. 2). Moreover, detectors (where used herein) may be swapped for sensors (where used herein) without limitation. For example, detectors may be provided on the housing or a liner 8 of the housing, and the sensors 10 may be provided within the rotor and/or stator 4. Alternatively, detectors 9 may be omitted and only sacrificial sensors may be provided within each component. In such instances, when the sensor of a particular component stops working, the respective component has reached a predetermined amount of wear. Accordingly, it is to be understood that the drawings and descriptions herein are proffered by way of example to facilitate comprehension of the invention and should not be construed to limit the scope thereof.

What is claimed is:

1. A system for continuously monitoring wear of a rotor or stator in a flotation cell, comprising:
   (a) the flotation cell comprising the rotor and the stator therein;
   (b) multiple detectors; each detector of said multiple detectors being embedded within a vane of the rotor or stator; wherein a first detector of said multiple detectors is provided at a first radial location, in relation to a vertical axis of the flotation cell as a whole, which is different than a second radial location, in relation to said vertical axis of the flotation cell, of a second detector; each detector being configured as a sacrificial RFID tag; and
   (c) at least one sensor being configured as a reader/interrogator, the at least one sensor being provided to the flotation cell and configured to communicate with the multiple detectors wirelessly during operation of the flotation cell;
   wherein in use, the rotor or stator wears away and ultimately affects a function of the multiple detectors such that the first detector fails to provide a first confirmation signal responding to a first check signal transmitted by the at least one sensor after being consumed by a first amount of wear to the rotor or stator, and the second detector fails to provide a second confirmation signal responding to a second check signal transmitted by the at least one sensor after being consumed by a second amount of wear to the rotor or stator; the second amount of wear to the rotor or stator being greater than said first amount of wear to the rotor or stator;
   wherein, by virtue of communication with the multiple detectors, the at least one sensor is configured to monitor said function of the multiple detectors and determine an operational status of the rotor or stator, the operational status relating to wear experienced by the rotor or stator, and
   wherein in response to determining whether the rotor or stator experiences the second amount of wear, the at least one sensor is configured to relay an indication to notify an operator of the operational status of the rotor or stator.

2. The system of claim 1, wherein at least one of the multiple detectors comprises a low-frequency RFID tag, and the at least one sensor comprises a low-frequency detector/identifier in the kHz range of frequencies.

3. The system of claim 1, wherein at least one of the multiple detectors comprises an ultra-high frequency RFID tag, and the at least one sensor comprises an ultra-high frequency detector/identifier in the MHz range of frequencies.

4. The system of claim 1, wherein at least one of the multiple detectors comprises a microwave RFID tag, and the at least one sensor comprises a microwave detector/identifier which operates in the GHz range of frequencies.

5. The system of claim 1, wherein at least one of the multiple detectors comprises a self-powered RF-emitting wireless micro-transmitter, and the at least one sensor comprises a receiver tuned to the same frequency as said RF-emitting wireless micro-transmitter.

6. The system of claim 1, wherein the multiple detectors are provided to both the rotor and stator.

7. A flotation rotor or stator for use in a flotation cell comprising:
 multiple detectors; each detector of said multiple detectors being embedded within a vane of the flotation rotor or stator; wherein a first detector of said multiple detectors is provided at a first radial or circumferential location, in relation to a vertical axis of the flotation cell as a whole, which is different than a second radial or circumferential location, in relation to said vertical axis of the flotation cell, of a second detector;
 each detector being configured as a sacrificial RFID tag configured to wirelessly communicate with a sensor provided to the flotation cell; the sensor being configured as reader/interrogator;
 wherein in use, the flotation rotor or stator is configured to wear away ultimately affecting a function of the multiple detectors such that the first detector fails to provide a first confirmation signal responding to a first check signal transmitted by the sensor, after being consumed by a first amount of wear to the flotation rotor or stator, and the second detector fails to provide a second confirmation signal responding to a second check signal transmitted by the sensor, after being consumed by a second amount of wear to the flotation rotor or stator; the second amount of wear to the flotation rotor or stator being greater than said first amount of wear to the flotation rotor or stator;
 wherein, by virtue of wireless communication with said sensor, the multiple detectors are configured to aid in determining an operational status of the flotation rotor or stator, the operational status relating to wear experienced by the flotation rotor or stator, and
 wherein in response to determining whether the flotation rotor or stator experiences the second amount of wear, said sensor is configured to relay an indication to notify an operator of the operational status of the flotation rotor or stator.

8. The flotation rotor or stator of claim 7, wherein at least one detector of the multiple detectors is provided to the flotation rotor or stator as a separate component.

9. The flotation rotor or stator of claim 7, further comprising a cavity 5 and a threaded insert, cover plug, cover cap, or tapered cover plug for embedding at least one detector of the multiple detectors.

* * * * *